(12) United States Patent
Tsai

(10) Patent No.: US 8,671,437 B2
(45) Date of Patent: Mar. 11, 2014

(54) UNIVERSAL REMOTE CONTROL MANAGEMENT IN DIGITAL DISPLAY DEVICES

(75) Inventor: Leonard Tsai, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 12/867,841

(22) PCT Filed: Nov. 3, 2010

(86) PCT No.: PCT/US2010/055234
§ 371 (c)(1),
(2), (4) Date: Aug. 16, 2010

(87) PCT Pub. No.: WO2011/062763
PCT Pub. Date: May 26, 2011

(65) Prior Publication Data
US 2011/0219404 A1    Sep. 8, 2011

(51) Int. Cl.
*H04N 7/173* (2011.01)

(52) U.S. Cl.
USPC .......................... 725/133; 725/134; 348/734

(58) Field of Classification Search
USPC ................. 725/131–134, 139–142, 151–153; 348/734
See application file for complete search history.

(56) References Cited

U.S. PATENT DOCUMENTS

| | | | |
|---|---|---|---|
| 5,519,457 A * | 5/1996 | Nishigaki et al. | 348/734 |
| 5,949,351 A | 9/1999 | Hahm | |
| 6,466,233 B1 | 10/2002 | Mitani | |
| 6,563,430 B1 * | 5/2003 | Kemink et al. | 340/8.1 |
| 6,650,247 B1 | 11/2003 | Hayes | |
| 7,046,161 B2 | 5/2006 | Hayes | |
| 7,064,675 B2 * | 6/2006 | Zigmond et al. | 340/12.53 |
| 7,129,855 B2 | 10/2006 | Krzyzanowski et al. | |
| 7,135,985 B2 | 11/2006 | Woolgar et al. | |
| 7,191,245 B2 | 3/2007 | Takayama | |
| 7,266,777 B2 | 9/2007 | Scott et al. | |
| 2002/0060749 A1 | 5/2002 | Funakoshi et al. | |
| 2002/0194596 A1 | 12/2002 | Srivastava | |
| 2003/0117294 A1 * | 6/2003 | Hatano et al. | 340/825.72 |
| 2003/0141987 A1 | 7/2003 | Hayes | |
| 2004/0070491 A1 | 4/2004 | Huang et al. | |
| 2005/0068222 A1 | 3/2005 | Krzyzanowski et al. | |
| 2006/0143572 A1 | 6/2006 | Scott et al. | |
| 2006/0288300 A1 | 12/2006 | Chambers et al. | |
| 2006/0288370 A1 | 12/2006 | Rothschild | |
| 2007/0130607 A1 | 6/2007 | Thissen et al. | |
| 2008/0016073 A1 | 1/2008 | Kobayashi et al. | |

FOREIGN PATENT DOCUMENTS

KR    10-2007-0029408    3/2007

OTHER PUBLICATIONS

International Search Report for International Application No. PCT/US2008/055234, filed Feb. 28, 2008. Date of Mailing Sep. 30, 2008.

* cited by examiner

*Primary Examiner* — Annan Shang

(57) ABSTRACT

In one embodiment, a system, comprising at least a first video source device, at least a first remote control device, a digital display device comprising logic to receive, in a digital display device, a signal to initiate an aggregation process, in response to the signal, enumerate at least a first video source device coupled to the digital display device, obtain, from the at least a first video source device, a first remote control code table, merge the first remote control table into a master remote control table, receive in the primary interface device manager, a user interface database from the secondary interface device manager, and store the master remote control table in memory.

20 Claims, 4 Drawing Sheets

UNIVERSAL REMOTE CONTROL MANAGEMENT IN DIGITAL DISPLAY DEVICES

BACKGROUND

Digital display devices may be controlled by remote devices, typically by an infrared link. In some instances a digital display device such as a digital television may be coupled to multiple devices. In some circumstances it may be useful to permit integrated control of several devices coupled to the common display device.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Some of the embodiments discussed herein may provide techniques to implement universal remote control management in digital display devices. Such techniques may enable a digital display device such as, e.g., a digital television, and one or more video source devices such as, e.g., a digital video disk (DVD) player, a personal computer, or a home storage server to integrate their respective remote control code tables, also referred to as infrared (IR) tables, into a single table which may be uploaded to a single remote control device, thereby allowing the single remote control device to control multiple devices directly.

Figure 1:
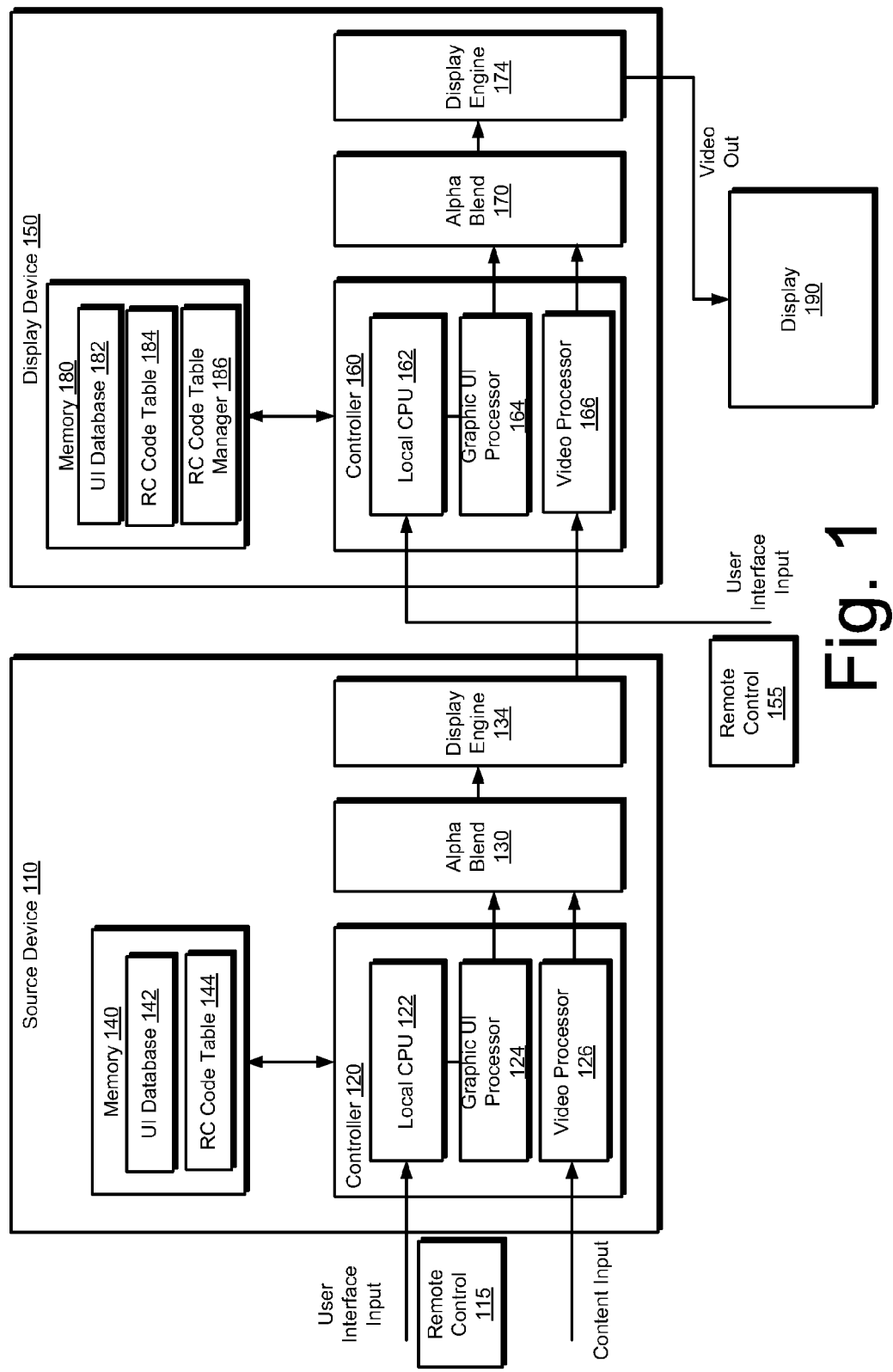
FIG. 1 is a schematic illustration of a digital display system architecture in accordance with some embodiments.

FIG. 1 is a schematic illustration of a digital display system architecture in accordance with some embodiments. Referring to FIG. 1, the architecture comprises at least one source device 110 coupled to a digital display device 150 by or more communication connections 140. In practice, a display device 150 may be coupled to multiple source devices such as, e.g., e.g., a digital video disk (DVD) player, a personal computer, or a home storage server, or the like by a communication connection such as, e.g., a High-Definition Multimedia Interface (HDMI) connection, an RF (coaxial cable) connection, a composite video connection, an S-video connection, a VGA connection, or the like.

In some embodiment, source device 110 comprises a controller 120 and a memory module 140. Controller 120 comprises a local CPU, or processor, 122, a graphical user interface (UI) processor 124, a video processor 126. The processor 122 may be a conventional computer processor, a configurable processor such as, for example, a field programmable gate array (FPGA), or a processor specifically designed for distribution system 110, for example, an application specific integrated circuit (ASIC). Similarly, graphical user interface processor 124 may be implemented as a separate controller (i.e., an application specific integrated circuit (ASIC) or a field programmable gate array (FPGA) or may be integrated into processor 122. Alternatively, graphical user interface processor 124 may be implemented as logic instructions which, when execute don a processor, provide the functionality of a graphical user interface. The video processor 126 may be implemented as an adjunct video/graphics processor, or may be integrated into processor 122.

Memory module 140 may comprise active memory such as, RAM, and may comprise one or more persistent storage media, for example one or more hard disk drives, optical drives, tape disk drives, or the like. In the embodiment depicted in FIG. 1, memory module 130 comprises a user interface database 142 which comprises screen settings and display parameters used by the graphical user interface processor 126 to implement a graphical user interface which may be used to control the source device 110. In addition, memory 140 comprises a remote control (RC) code table 144 which comprises entries that correlate operations with signal codes from a remote control device 115. For example, remote control device 115 may be coupled to the source device via an infrared (IR) link or an electromagnetic (i.e., radio) link to provide user interface input to local CPU 122. Local CPU receives the signal and consults the RC code table 144 to locate the operation represented by the signal.

Video source device 110 further comprises a mixer such as, e.g., an alpha blender module 130 which overlays output from graphical user interface processor 124 onto output from the video processor 126, such that a user interface may be displayed "on top of" a video screen. Output from the alpha blend module is input to a display engine, which in turn generates an output for display on a display module.

In some embodiments, display device 150 may be implemented as a digital television, a computer system, or other digital rendering system. In relevant part, display device comprises many components which are redundant in view of the components included in source device 110. For example, digital display device 150 comprises a controller 160 and a memory module 180. Controller 160 comprises a local CPU, or processor, 162, a graphical user interface (UI) processor 164, a video processor 166. The processor 162 may be a conventional computer processor, a configurable processor such as, for example, a field programmable gate array (FPGA), or a processor specifically designed for display device 150, for example, an application specific integrated circuit (ASIC). Similarly, graphical user interface processor 164 may be implemented as a separate controller (i.e., an application specific integrated circuit (ASIC) or a field programmable gate array (FPGA) or may be integrated into processor 162. Alternatively, graphical user interface processor 164 may be implemented as logic instructions which, when execute don a processor, provide the functionality of a graphical user interface. The video processor 166 may be implemented as an adjunct video/graphics processor, or may be integrated into processor 162.

Memory module 180 may comprise active memory such as, RAM, and may comprise one or more persistent storage media, for example one or more hard disk drives, optical drives, tape disk drives, or the like. In the embodiment depicted in FIG. 1, memory module 180 comprises a user interface database 182 which comprises screen settings and display parameters used by the graphical user interface processor 166 to implement a graphical user interface which may be used to control the display device 150. In addition, memory 140 comprises a remote control (RC) code table 184 which comprises entries that correlate operations with signal codes from a remote control device 155. For example, remote control device 155 may be coupled to the display device 150 via an infrared (IR) link or an electromagnetic (i.e., radio) link to provide user interface input to local CPU 162. Local CPU receives the signal and consults the RC code table 184 to locate the operation represented by the signal.

The graphical user interface processor 164 enables a user to generate input to control the display device 150, for example by a remote control device which establishes a communication link with the display device through an infrared (IR) interface, and electromagnetic interface, or the like. Input from the user interface is presented to the controller 160 through the local CPU 162, which is coupled to the graphical; user interface processor 164. The graphical user interface processor 164 processes input from the user interface input and uses data from the user interface database 182 to enable a user to control the device 150 from screens presented on the display 190.

Display device 150 further comprises a mixer such as, e.g., an alpha blender module 170 which overlays output from graphical user interface processor 164 onto output from the video processor 166, such that a user interface may be displayed "on top of" a video screen. Output from the alpha blend module is input to a display engine, which in turn generates an output for display on a display module.

A display device 190 such as, e.g., a liquid crystal display (LCD) monitor, a plasma monitor, or a cathode ray tube (CRT) monitor is coupled to the display engine 174.

In operation, video content from the source device 110 is passed from the display engine 134 to the video processor 164 of the display device 150. The video content may comprise, for example, movies, television content, videos, and the like. In most cases the display engine 134 will output video that is fully prepared for presentation on a display such as display 190. In this circumstance, the video output from display engine 134 may bypass video processor 164, or video processor 164 may effectively act as a "pass through" component, which does not actively process the video content. However, in some embodiments video content output from the display engine 134 may require further processing, for example to format the video content in a format appropriate for the display 190. In this circumstance, the video processor 166 processes the video content output by the display engine 134.

In one embodiment, the controllers 120 and 160 are adapted to cooperate such that the RC code table 144 from one or more video source devices 110 can be downloaded to the display device, which merges the RC code tables with its own RC code table to form a master RC code table, which can be uploaded to a remote control device. Operation of multiple devices may then be accomplished via a single remote control device.

Figure 2:
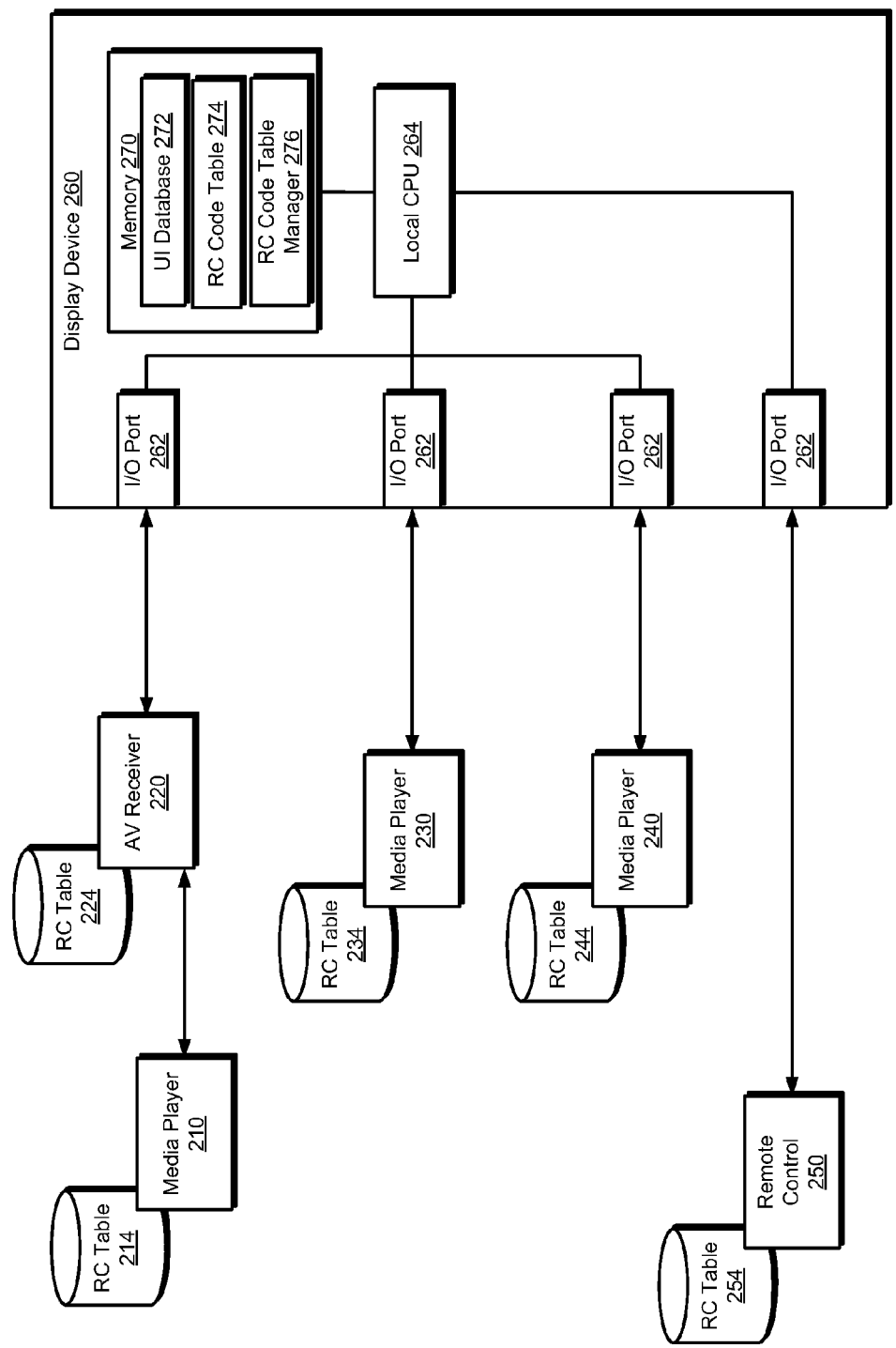
FIG. 2 is a schematic illustration of a digital entertainment environment.

FIG. 2 is a schematic illustration of a digital entertainment environment, in accordance with some embodiments. Referring to FIG. 2, a display device 260 is coupled to a plurality of video source devices including a first media player 210 which is coupled to the display device 260 via an audio video receiver 220. A second media player 230 and a third media player 240 are coupled directly to the display device 260. Media players 210, 230, 240 may be implemented as digital video disc (DVD) players, video cassette recorder (VCR) players, personal computers, laptops computers, or other media players.

In some embodiments each media player comprises a remote control (RC) code table which includes entries which correlate operations with signal patterns from a remote control as described above. Thus, media player 210 comprises a remote control code table 214, AV receiver 220 comprises a remote control code table 224, media player 230 comprises a remote control code table 234, and media player 240 comprises a remote control code table 244.

In addition, a remote control device 250 may be coupled to the display device 260 by an infrared link, an electromagnetic link, or the like. Remote control 250 also comprises a remote control code table 254 which comprises entries correlating remote control codes with operations for the display device 260.

In some embodiments, media players 210, 230, 240 and AV receiver 220 are coupled to display device via an HDMI connection. In alternate embodiments, media players 210, 230, 240 and AV receiver 220 are coupled to display device via an RF (coaxial cable) connection, a composite video connection, an S-video connection, a VGA connection, or the like.

Display device 260 comprises a plurality of input/output ports 262 to which the respective media players may be coupled. The input/output ports are coupled to a local CPU 264. Display device 260 further comprises a memory module 270. A user interface database 272 and a remote control code table 274 reside in memory 270. Remote control code table 274 comprises entries correlating remote control codes with operations for the display device 260.

In addition a remote control code table manager resides as logic instructions recorded in memory 270. When executed by the local CPU 264, the remote control code table manager logic instructions configured the local CPU to implement operations to collect the remote control code tables from the media players 210, 230 and 240, and the AV receiver 220, and to merge these remote control tables into a master remote control code table. Operations implemented by the remote control code table manager 276 will be explained with reference to FIGS. 3-4, which are flowcharts illustrating operations of methods for universal remote control management, in accordance with some embodiments.

Figure 3:
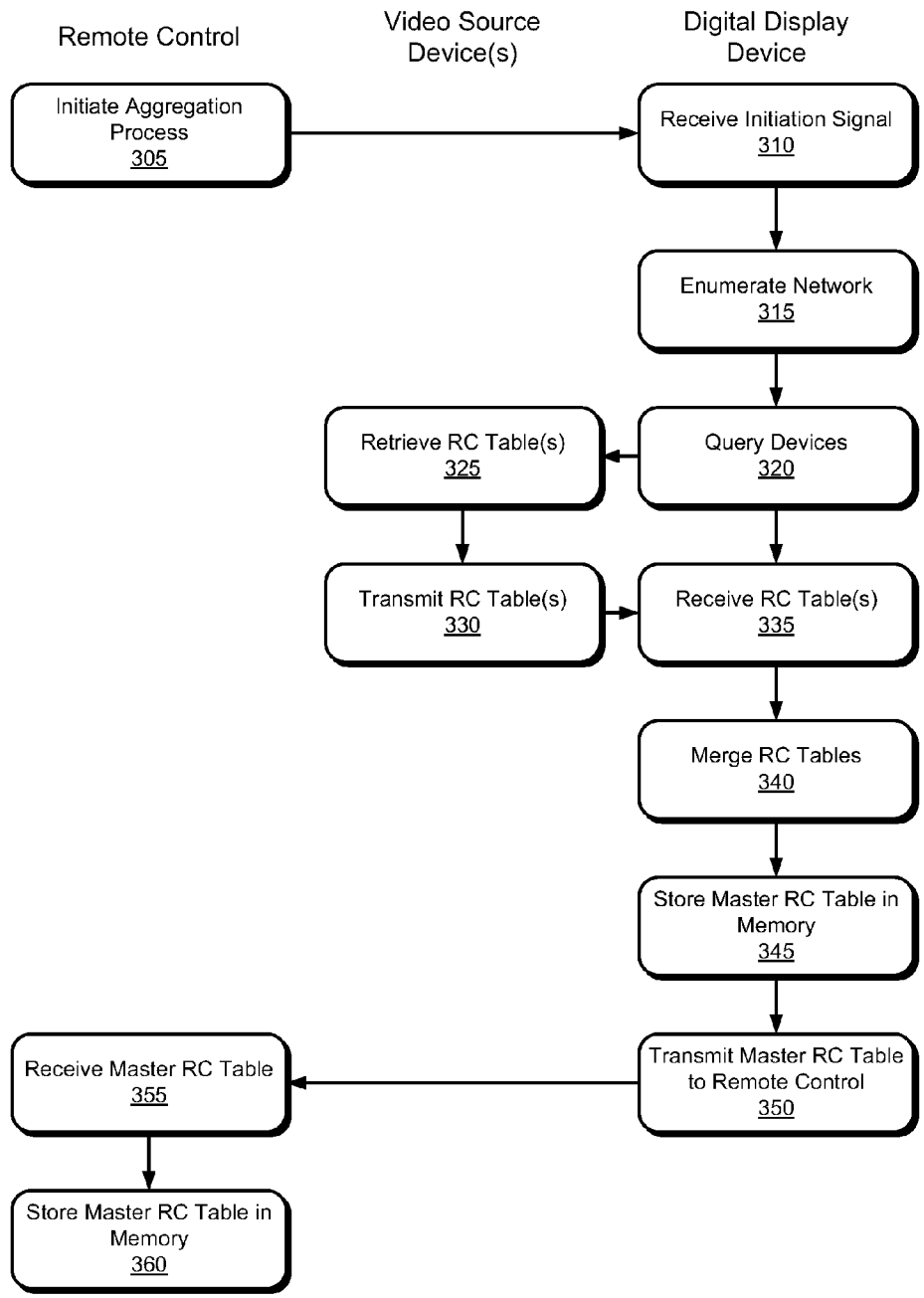
FIGS. 3-4 are flowcharts illustrating operations of methods for universal remote control management, in accordance with some embodiments.

In some embodiments, the operations depicted in FIG. 3 may be implemented by the remote control code table manager 276 of source device 260 in combination with the remote control 250 and the controllers 120 of the various source devices 210, 220, 230, 240 coupled to the display device 260. In some embodiments the operations in the left-hand column of FIG. 3 may be implemented by the remote control device 250, operations in the center column may be implemented by the respective video source devices 210, 220, 230, 240, and the operations in the right-hand column of FIG. 3 may be implemented by the remote control code table manager 276 of display device 260.

Referring to FIG. 3, in some embodiments the method may be initiated at operation 305 when a remote control 150 generates a signal to initiate a remote control code table aggregation process. For example, a user may initiate the process by using the remote control 250 within the context of a user interface menu.

At operation 310 the signal is received by the digital display device 260. In response to the signal, the display device 260 implements operations to enumerate (operation 315) the video sources, i.e., media players, which are coupled to the display device 260. For example, embodiments in which the media players 210, 230, 240, and the AV receiver 220 are coupled to the display device 260 via an HDMI interface the remote control code table manager 276 can monitor the CEC (consumer electronics control) channel of the HDMI interface to obtain a network address for each of the devices 210, 220, 230, 240.

At operation 320 the remote control code table manager 276 queries the devices 210, 220, 230, 240 to request the remote control code tables from the respective devices 210, 220, 230, 240. At operation 325 the devices 210, 220, 230, 240 retrieve their respective remote control code tables from memory, and that operation 330 the devices 210, 220, 230, 240 transmit their respective remote control code tables to the display device 260.

At operation 335 the remote control code tables are received in the display device 260, and at operation 340 the remote control code tables received from the devices 210, 220, 230, 240 are merged with the remote control code table 274 from the display device 262 form a master remote control code table. Additional details relating to the function of merging the remote control tables received from the devices 210, 220, 230, 240 are described with reference to FIG. 4, below.

At operation 345 the master remote control code table generate an operation 340 is stored in the memory 270 of display device 260. In some embodiments, the master remote control code table replaces the original remote control code table 274 in the memory 270 of display device 260.

At operation 350 the master remote control code table is transmitted from the display device 262 the remote control device 250. At operation 355 remote control device 250 receives the master remote control code table, and at operation 360 the master remote control code table is stored in the memory of the remote control device 250. In some embodiments, the master remote control code table replaces the original remote control code table 254 in the memory of the remote control 250.

Figure 4:
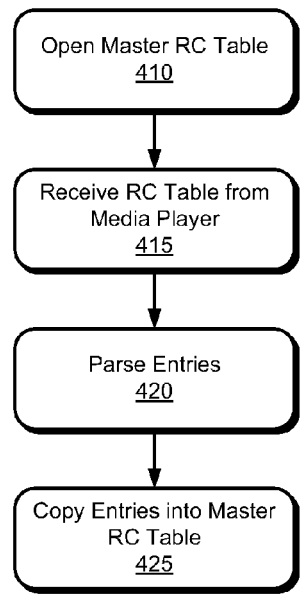

FIG. 4 is a flowcharts illustrating in greater detail operations involved in merging the remote control code table (operation 340). Referring to FIG. 4, at operation 410 the remote control code table manager 276 opens a master remote control code table. At operation 415 the remote control code table manager 276 receives a remote control code table from a media player such as one of the media players 210, 220, 230, 240. At operation 420 the remote control code table manager 276 parses the entries in the table, and at operation 425 the remote control code table manager 276 copies the entries into the master remote control code table.

Thus, described herein are exemplary systems and methods to implement an universal remote control management in a digital display system. The operations depicted in FIGS. 3-4 may be performed upon system initialization, by the request of a user, when a new device is plug into the display system or periodically in time. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disks, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method to manage a user interface in a digital display device, comprising:
    receiving, in a digital display device, a signal to initiate an aggregation process;
    in response to the signal, enumerating, by the digital display device, at least a first video source device coupled to the digital display device;
    obtaining, by the digital display device from the at least a first video source device, a first remote control code table, the first remote control code table comprising signal codes correlated with operations of the at least a first video source device;
    merging, in the digital display device, the first remote control code table into a master remote control code table; and
    storing, in memory of the digital display device, the master remote control code table.

2. The method of claim 1, wherein enumerating, by the digital display device, at least a first video source device coupled to the digital display device comprises monitoring, by the digital display device, a consumer electronics control (CEC) channel to obtain a network address for the at least a first video source device.

3. The method of claim 1, wherein obtaining, by the digital display device from the at least a first video source device, a first remote control code table, comprises:
    launching, by the digital display device, a query to the at least a first video source device, wherein the query requests the first remote control code table from the at least a first video source device; and
    receiving, by the digital display device, the first remote control code table from the at least a first video source device in response to the query.

4. The method of claim 3, further comprising:
    receiving, in the at least a first video source device, the query;
    retrieving the first remote control code table from a memory in the at least a first video source device in response to the query; and
    transmitting the first remote control code table from the at least a first video source to the digital display device.

5. The method of claim 1, wherein merging, in the digital display device, the first remote control code table into a master remote control code table comprises:
    opening, by the digital display device, the master remote control code table;
    receiving, by the digital display device, the first remote control code table from the at least a first video source device;
    parsing, by the digital display device, entries in the first remote control code table; and copying, by the digital display device, entries from the first remote control code table into the master remote control code table.

6. The method of claim 1, further comprising:
transmitting, by the digital display device, the master remote control code table to a remote control device;
receiving, in the remote control device, the master remote control code table; and
storing, in memory of the remote control device, the master remote control code table.

7. The method of claim 1, wherein obtaining, by the digital display device from the at least a first video source device, a first remote control code table, comprises:
receiving the first remote control code table directly from the at least a first video source device.

8. A system, comprising:
a digital display device;
at least a first video source device coupled to the digital display device; and
at least a first remote control device,
the digital display device comprising logic to:
receive, from the at least a first remote control device, a signal to initiate an aggregation process;
in response to the signal, enumerate the at least a first video source device coupled to the digital display device;
obtain, from the at least a first video source device, a first remote control code table, the first remote control code table comprising signal codes correlated with operations of the at least a first video source device;
merge the first remote control code table into a master remote control code table of the digital display device; and
store the master remote control code table in memory of the digital display device.

9. The system of claim 8, wherein the digital display device further comprises logic to monitor a consumer electronics control (CEC) channel to obtain a network address for the at least a first video source device.

10. The system of claim 8, wherein the digital display device further comprises logic to:
launch a query to the at least a first video source device, wherein the query requests the first remote control code table from the at least a first video source device; and
receive the first remote control code table from the at least a first video source device in response to the query.

11. The system of claim 10, wherein the at least a first video source device comprises logic to:
receive the query from the digital display device;
retrieve the first remote control code table from a memory in the at least a first video source device in response to the query; and
transmit the first remote control code table from the at least a first video source to the digital display device.

12. The system of claim 8, wherein the digital display device further comprises logic to:
open the master remote control code table;
receive the first remote control code table from the at least a first video source device;
parse entries in the first remote control code table; and
copy entries from the first remote control code table into the master remote control code table.

13. The system of claim 8, wherein the digital display device further comprises logic to:
transmit the master remote control code table to the at least a first remote control device, and wherein the at least a first remote control device comprises logic to:
receive the master remote control code table from the digital display device; and
store the master remote control code table in memory of the at least a first remote control device.

14. The system of claim 8, wherein the logic to obtain, from the at least a first video source device, a first remote control code table, comprises logic to:
receive the signal codes correlated with the operations of the at least a first video source device in the first remote control code table without input by a user.

15. A computer program product comprising logic instructions stored on a non-transitory computer-readable medium which, when executed by a processor, configure the processor to:
receive, in a digital display device, a signal to initiate an aggregation process;
in response to the signal, enumerate, by the digital display device, at least a first video source device coupled to the digital display device;
obtain, by the digital display device from the at least a first video source device, a first remote control code table, the first remote control code table comprising signal codes correlated with operations of the at least a first video source device;
merge, in the digital display device, the first remote control code table into a master remote control code table; and
store, in memory of the digital display device, the master remote control code table.

16. The computer program product of claim 15, further comprising logic instructions stored on a non-transitory computer-readable medium which, when executed by a processor, configure the processor to monitor a consumer electronics control (CEC) channel to obtain a network address for the at least a first video source device.

17. The computer program product of claim 15, further comprising logic instructions stored on a non-transitory computer-readable medium which, when executed by a processor, configure the processor to:
launch, by the digital display device, a query to the at least a first video source device, wherein the query requests the first remote control code table from the at least a first video source device; and
receive, by the digital display device, the first remote control code table from the at least a first video source device in response to the query.

18. The computer program product of claim 15, further comprising logic instructions stored on a non-transitory computer-readable medium which, when executed by a processor, configure the processor to:
open, by the digital display device, the master remote control code table;
receive, by the digital display device, the first remote control code table from the at least a first video source device;
parse, by the digital display device, entries in the first remote control code table; and
copy, by the digital display device, entries from the first remote control code table into the master remote control code table.

19. The computer program product of claim 15, further comprising logic instructions stored on a non-transitory computer-readable medium which, when executed by a processor, configure the processor to transmit the master remote control code table to a remote control device.

20. The computer program product of claim 15, further comprising logic instructions stored on a non-transitory computer-readable medium which, when executed by a processor, configure the processor to:
receive the signal codes correlated with the operations of the at least a first video source device in the first remote control code table directly from the at least a first video source device without input by a user.

* * * * *

UNITED STATES PATENT AND TRADEMARK OFFICE
CERTIFICATE OF CORRECTION

PATENT NO.        : 8,671,437 B2  
APPLICATION NO.   : 12/867841  
DATED             : March 11, 2014  
INVENTOR(S)       : Leonard Tsai Page 1 of 1

It is certified that error appears in the above-identified patent and that said Letters Patent is hereby corrected as shown below:

On the title page, in item (22), PCT filed, in column 1, line 1, delete "Nov. 3, 2010" and insert -- Feb. 28, 2008 --, therefor.

On the title page, in item (86), PCT No., in column 1, line 1, delete "PCT/US2010/055234" and insert -- PCT/US2008/055234 --, therefor.

On the title page, in item (87), PCT Pub. No., in column 1, line 1, delete "WO2011/062763" and insert -- WO2009/108197 --, therefor.

On the title page, in item (87), PCT Pub. Date, in column 1, line 2, delete "May 26, 2011" and insert -- Sep. 3, 2009 --, therefor.

Signed and Sealed this  
Sixteenth Day of September, 2014

Michelle K. Lee  
*Deputy Director of the United States Patent and Trademark Office*